United States Patent
Iley et al.

(10) Patent No.: US 11,520,566 B2
(45) Date of Patent: Dec. 6, 2022

(54) SYSTEM FOR GENERATION AND MAINTENANCE OF SOURCE CAPABILITY OBJECTS FOR APPLICATION COMPONENTS

(71) Applicant: BANK OF AMERICA CORPORATION, Charlotte, NC (US)

(72) Inventors: Dean Alan Iley, Chesapeake, VA (US); Erik Dahl, Newark, DE (US); Gordon Matthew Woods, Norfolk, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/001,251

(22) Filed: Aug. 24, 2020

(65) Prior Publication Data
US 2022/0058000 A1    Feb. 24, 2022

(51) Int. Cl.
*G06F 8/36*    (2018.01)
*G06F 8/60*    (2018.01)
(Continued)

(52) U.S. Cl.
CPC .............. *G06F 8/36* (2013.01); *G06F 8/60* (2013.01); *G06F 8/71* (2013.01); *G06F 11/3612* (2013.01); *G06F 16/148* (2019.01); *G06Q 10/103* (2013.01)

(58) Field of Classification Search
CPC .... G06F 3/0482; G06F 3/04847; G06F 40/30; G06F 16/3331; G06F 8/36; G06F 16/148;
(Continued)

(56) References Cited

U.S. PATENT DOCUMENTS

| | | | |
|---|---|---|---|
| 7,000,220 B1* | 2/2006 | Booth ................. | G06F 8/71 |
| | | | 717/110 |
| 2004/0064543 A1* | 4/2004 | Ashutosh ............. | G06Q 40/06 |
| | | | 709/224 |

(Continued)

OTHER PUBLICATIONS

Jack Greenfield et al.; Software Factories Assembling Applications with Patterns, Models, Frameworks and Tools; ACM; pp. 16-27; retrieved on Jul. 28, 2022 (Year: 2003).*

(Continued)

*Primary Examiner* — S. Sough
*Assistant Examiner* — Cuong V Luu
(74) *Attorney, Agent, or Firm* — Moore & Van Allen PLLC; R. W. McCord Rayburn

(57) ABSTRACT

Systems, computer program products, and methods for generating and maintaining source capability objects for application components. The systems, computer program products, and methods are configured to receive a request to initiate a development process for an application, where the request identifies one or more components of the application, and cause a user device to prompt a user to select, for each component of the application, one or more source capabilities from a plurality of source capabilities. The systems, computer program products, and methods are further configured to receive, from the user device and for each component of the application, the one or more source capabilities and to generate, for each component of the application, a source capability object including information identifying the one or more source capabilities for the component.

19 Claims, 5 Drawing Sheets

(51) Int. Cl.
*G06F 11/36* (2006.01)
*G06Q 10/10* (2012.01)
*G06F 16/14* (2019.01)
*G06F 8/71* (2018.01)

(58) Field of Classification Search
CPC .......... G06F 8/60; G06F 8/71; G06F 11/3612; G06N 5/022; G06Q 10/103
See application file for complete search history.

(56) References Cited

U.S. PATENT DOCUMENTS

| | | | | |
|---|---|---|---|---|
| 2005/0055667 | A1* | 3/2005 | Beringer | G06F 8/36 717/108 |
| 2009/0178026 | A1* | 7/2009 | Mital | G06F 8/36 717/120 |
| 2015/0067642 | A1* | 3/2015 | Chen | G06F 8/60 717/121 |
| 2017/0147327 | A1* | 5/2017 | Hoff | G06F 8/61 |
| 2018/0373507 | A1* | 12/2018 | Mizrahi | G06F 8/433 |
| 2019/0138318 | A1* | 5/2019 | Yang | G06F 8/60 |
| 2021/0342204 | A1* | 11/2021 | Choudhury | G06F 11/004 |

OTHER PUBLICATIONS

Rudolf K. Keller et al.; Pattern-Based Reverse-Engineering of Design Components; ACM; pp. 226-235; retrieved on Jul. 28, 2022 (Year: 1999).*

* cited by examiner

SYSTEM FOR GENERATION AND MAINTENANCE OF SOURCE CAPABILITY OBJECTS FOR APPLICATION COMPONENTS

FIELD OF THE INVENTION

The present invention embraces a system for generating and maintaining source capability objects for application components.

BACKGROUND

An entity may operate a system that hosts multiple platforms configured to perform one or more functions. Users (e.g., developers) may create applications and deploy the applications on the platforms to increase functionality of the platforms. Each application may include one or more components. In some cases, the number of applications and components operating on the platform may be very large such that identifying components and/or applications that may be causing issues on the platforms and/or that may be useful for developing another application for a similar function may be difficult for an individual.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for generating and maintaining source capability objects for application components is presented. The system comprises: at least one non-transitory storage device; and at least one processing device coupled to the at least one non-transitory storage device, wherein the at least one processing device is configured to: receive, from a user device associated with a user, a request to initiate a development process for an application, wherein the request identifies one or more components of the application; cause, based on receiving the request to initiate the development process, the user device to prompt the user to select, for each component of the application, one or more source capabilities from a plurality of source capabilities, wherein the plurality of source capabilities is based on a source function taxonomy; receive, from the user device and for each component of the application, the one or more source capabilities selected by the user; generate, for each component of the application, a source capability object, wherein each source capability object comprises information identifying a component for which the source capability object was generated and the one or more source capabilities selected by the user for the component; deploy, at an end of the development process, the application; and store, based on deploying the application, the source capability object for each component of the application in a data repository.

In some embodiments, the request comprises information identifying at least one of a purpose, an input, an output, or a function of the application.

In some embodiments, the at least one processing device is configured to initiate, based on receiving the request, the development process for the application using a project management application.

In some embodiments, the at least one processing device is configured to, when causing the user device to prompt the user to select, for each component of the application, one or more source capabilities from the plurality of source capabilities, cause the user device to display the plurality of source capabilities for selection by the user.

In some embodiments, each source capability object comprises a record comprising data identifying the component for which the source capability object was generated and the one or more source capabilities selected by the user for the component.

In some embodiments, each source capability object comprises an extensible markup language file.

In some embodiments, the at least one processing device is further configured to maintain, during the development process and for each component of the application, a link between a component of the application and the source capability object generated for the component of the application.

In some embodiments, the at least one processing device is configured to: receive, during the development process and from the user device, a request to add another component to the application; cause, based on receiving the request to add the other component to the application, the user device to prompt the user to select, for the other component of the application, one or more source capabilities from the plurality of source capabilities; receive, from the user device, the one or more source capabilities selected by the user for the other component of the application; and generate, for the other component of the application, another source capability object comprising information identifying the other component of the application and the one or more source capabilities selected by the user for the other component.

In some embodiments, the at least one processing device is further configured to: receive, after deploying the application, a request to add another component to the application; cause, based on receiving the request to add the other component to the application, the user device to prompt the user to select, for the other component of the application, one or more source capabilities from the plurality of source capabilities; receive, from the user device, the one or more source capabilities selected by the user for the other component of the application; and generate, for the other component of the application, another source capability object comprising information identifying the other component of the application and the one or more source capabilities selected by the user for the other component.

In some embodiments, the at least one processing device is further configured to: receive, from another user device, a notification that a first source capability, of the plurality of source capabilities, is not functioning properly; query, based on the notification, source capability objects stored in the data repository to obtain a report identifying components associated with the first source capability; and provide the report to the other user device.

In some embodiments, the at least one processing device is further configured to: receive, from another user device, a list of source capabilities associated with another planned application; and query, based on the list of source capabilities, source capability objects stored in the data repository to obtain a report identifying components associated with each source capability of the list of source capabilities.

In some embodiments, the at least one processing device is further configured to: monitor a plurality of applications, wherein each application comprises one or more components having corresponding source capability objects stored in the data repository; determine, based on monitoring the plurality of applications, that components of a set of components are not functioning properly; query, based on the set of components, source capability objects stored in the data repository to obtain a report identifying a set of source capabilities associated with the set of components; and provide a notification to one or more user devices identifying the set of source capabilities.

In another aspect, a computer program product for generating and maintaining source capability objects for application components is presented. The computer program product comprises a non-transitory computer-readable medium comprising code causing a first apparatus to: receive, from a user device associated with a user, a request to initiate a development process for an application, wherein the request identifies one or more components of the application; cause, based on receiving the request to initiate the development process, the user device to prompt the user to select, for each component of the application, one or more source capabilities from a plurality of source capabilities, wherein the plurality of source capabilities is based on a source function taxonomy; receive, from the user device and for each component of the application, the one or more source capabilities selected by the user; generate, for each component of the application, a source capability object, wherein each source capability object comprises information identifying a component for which the source capability object was generated and the one or more source capabilities selected by the user for the component; deploy, at an end of the development process, the application; and store, based on deploying the application, the source capability object for each component of the application in a data repository.

In some embodiments, the request comprises information identifying at least one of a purpose, an input, an output, or a function of the application.

In some embodiments, the non-transitory computer-readable medium comprises code causing the first apparatus to initiate, based on receiving the request, the development process for the application using a project management application.

In some embodiments, the non-transitory computer-readable medium comprises code causing the first apparatus to, when causing the user device to prompt the user to select, for each component of the application, one or more source capabilities from the plurality of source capabilities, cause the user device to display the plurality of source capabilities for selection by the user.

In some embodiments, each source capability object comprises a record comprising data identifying the component for which the source capability object was generated and the one or more source capabilities selected by the user for the component.

In some embodiments, each source capability object comprises an extensible markup language file.

In some embodiments, the non-transitory computer-readable medium comprises code causing the first apparatus to maintain, during the development process and for each component of the application, a link between a component of the application and the source capability object generated for the component of the application.

In yet another aspect, a method for generating and maintaining source capability objects for application components is presented. The method comprises receiving, from a user device associated with a user, a request to initiate a development process for an application, wherein the request identifies one or more components of the application; causing, based on receiving the request to initiate the development process, the user device to prompt the user to select, for each component of the application, one or more source capabilities from a plurality of source capabilities, wherein the plurality of source capabilities is based on a source function taxonomy; receiving, from the user device and for each component of the application, the one or more source capabilities selected by the user; generating, for each component of the application, a source capability object, wherein each source capability object comprises information identifying a component for which the source capability object was generated and the one or more source capabilities selected by the user for the component; deploying, at an end of the development process, the application; and storing, based on deploying the application, the source capability object for each component of the application in a data repository.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
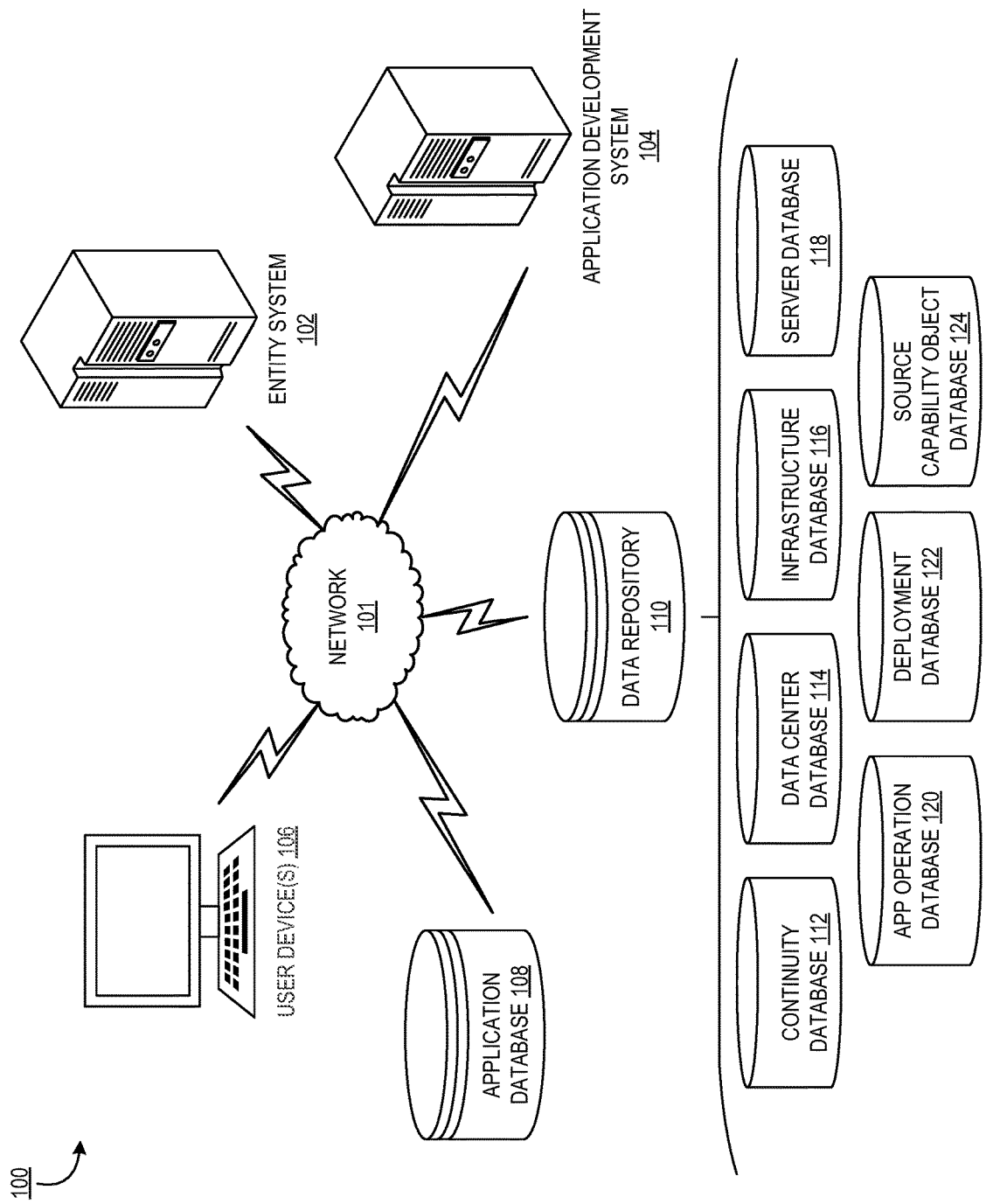
Figure 2:
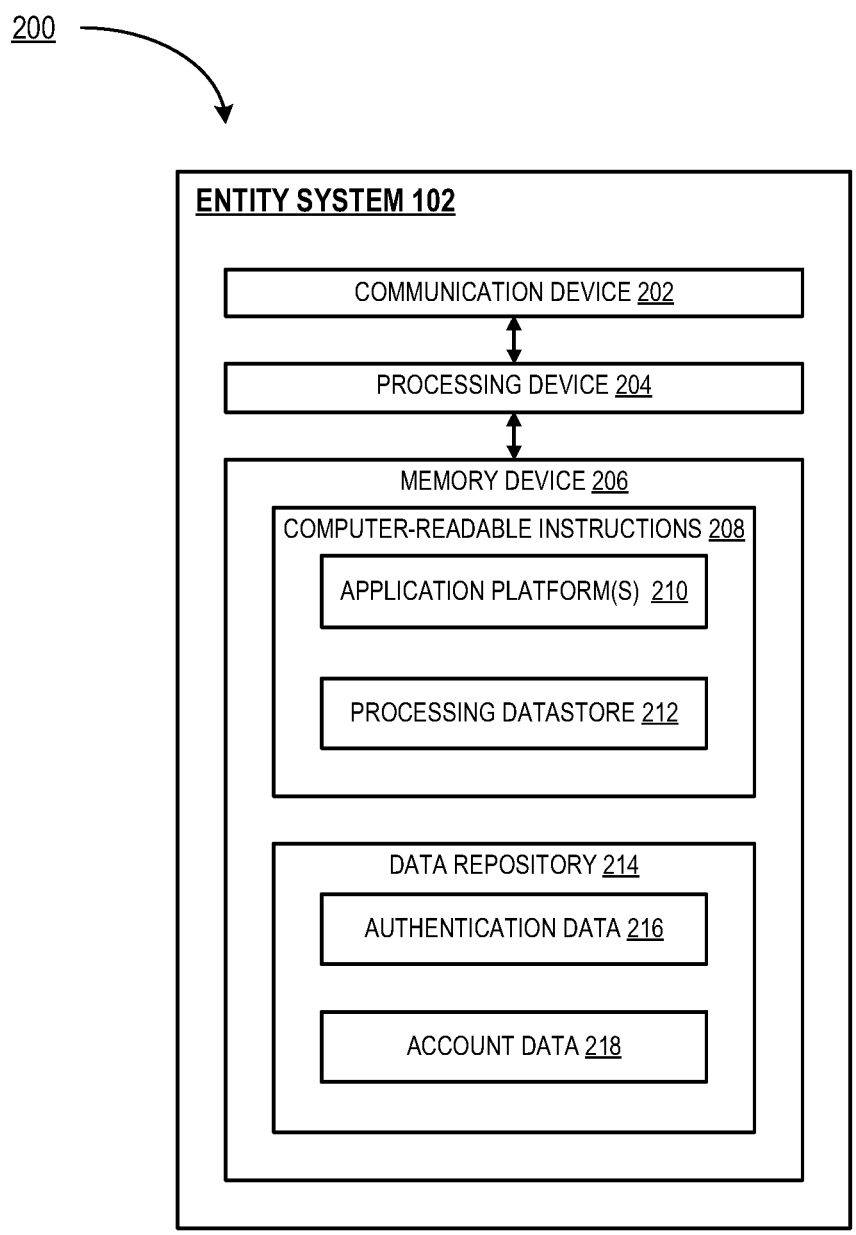
Figure 3:
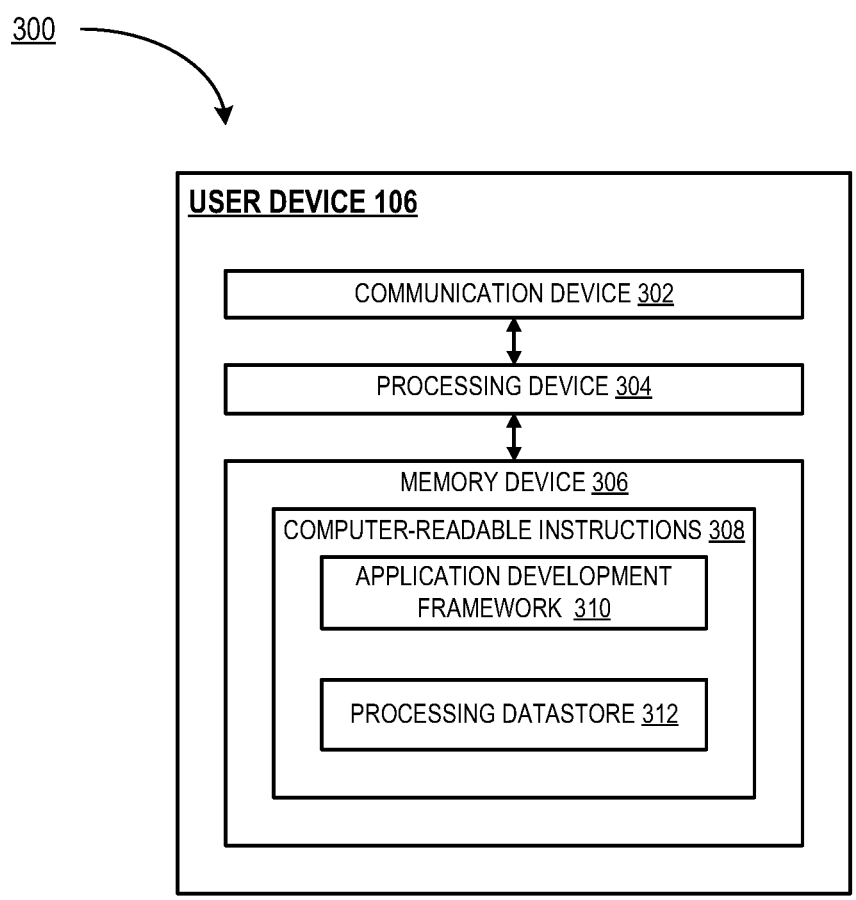
Figure 4:
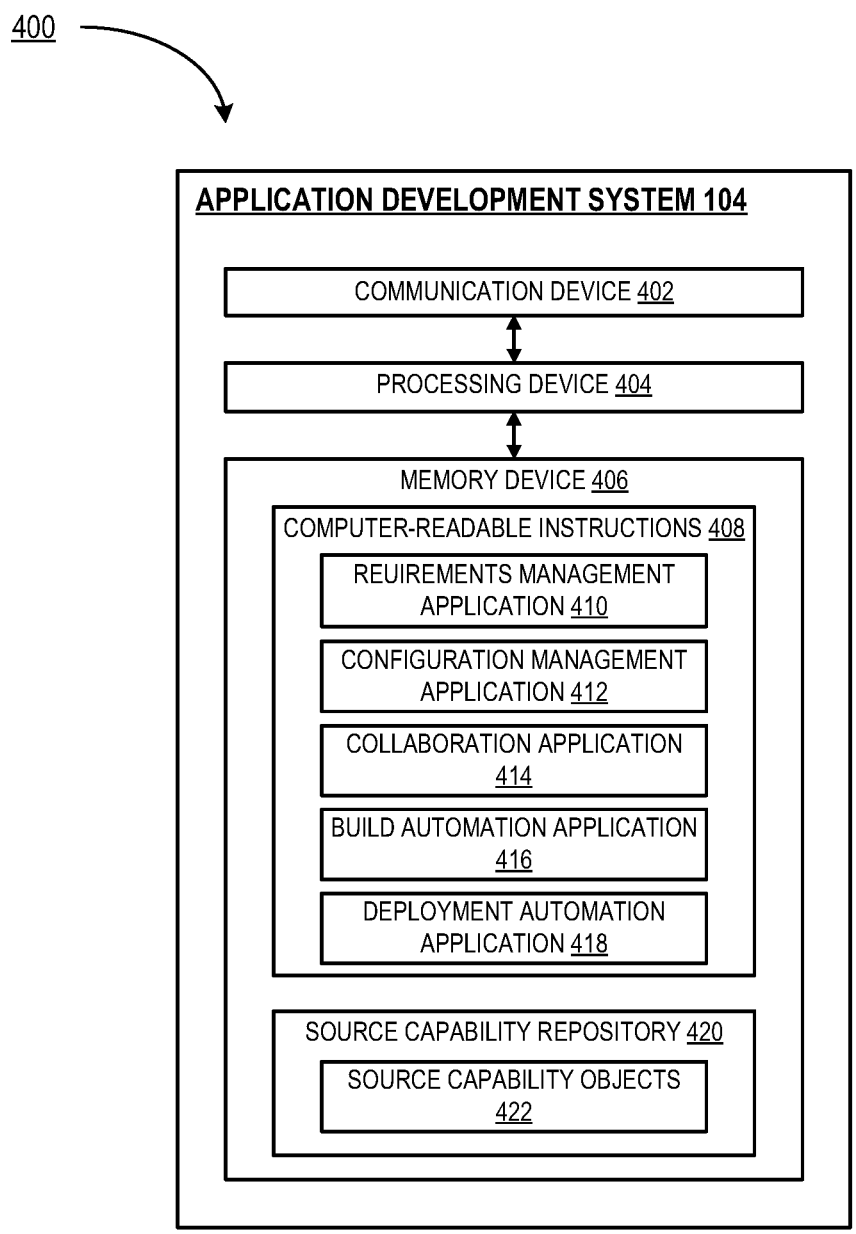
Figure 5:
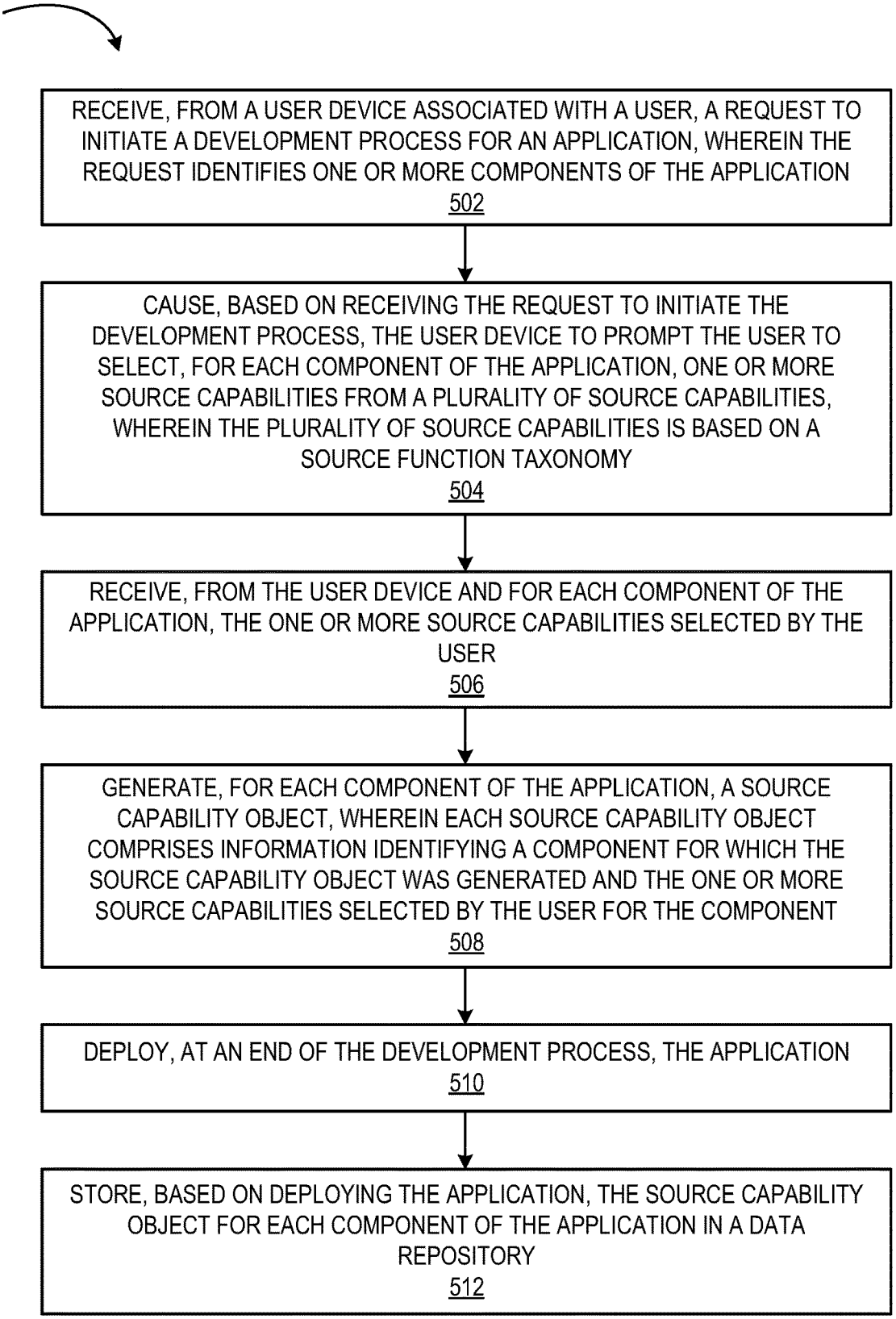

Having thus described embodiments of the invention in general terms, reference will now be made the accompanying drawings, wherein:

FIG. 1 illustrates a block network architecture diagram illustrating a system environment for generating and maintaining source capability objects for application components, in accordance with an embodiment of the invention;

FIG. 2 illustrates a block diagram of an entity system, in accordance with an embodiment of the invention;

FIG. 3 illustrates a block diagram of a user device, in accordance with an embodiment of the invention;

FIG. 4 illustrates a block diagram of an application development system, in accordance with an embodiment of the invention; and FIG. 5 illustrates a process flow for generating and maintaining source capability objects for application components, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" or "enterprise" may be any institution employing information technology resources and/or technology infrastructures configured for large-scale processing of electronic files, electronic technology event data and records, performing/processing associated technology activities, and/or the like. In some embodiments, the entity's technology systems may include multiple technology applications across multiple distributed technology platforms for large scale processing of technology activity files and electronic records. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a user may be an employee (e.g., a technology operator/technician, an associate, a project manager, an IT specialist, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "customer" may be an individual, group, and/or system associated with the entity. In some embodiments, a customer may be an individual, group, and/or system having past relationships, current relationships, or potential future relationships with an entity. For example, when the entity is a resource entity or a merchant, financial institution, and/or the like, a customer may be an individual, group, and/or system with one or more relationships, affiliations, and/or accounts with the entity (e.g., the merchant, the financial institution, and/or the like). In some embodiments, a customer may not be a direct customer of the entity but may instead be an individual, a group, and/or a system who has a relationship with a direct customer of the entity.

As used herein, a "technology resource" and/or "account" may be the relationship that a customer has with an entity. Examples of technology resources include a deposit account, such as a transactional account (e.g., a banking account), a savings account, an investment account, a money market account, a time deposit, a demand deposit, a pre-paid account, a credit account, customer information, or the like. The technology resource or account may be associated with and/or maintained by an entity, and may typically be associated with technology infrastructure such that the resource or account may be accessed, modified, or acted upon by the customer electronically, for example, using transaction terminals, user devices, merchant systems, and the like. In some embodiments, the entity may provide one or more technology instruments or financial instruments to the customer for executing resource transfer activities or financial transactions. In some embodiments, the technology instruments/financial instruments, such as electronic tokens, credit cards, debit cards, checks, loyalty cards, user device applications, account identifiers, routing numbers, passcodes and the like, may be associated with one or more resources or accounts of the customer. In some embodiments, the entity may represent a vendor or a merchant with whom the customer engages in financial transactions (e.g., resource transfers like purchases, payments, returns, enrolling in merchant accounts, and the like) or non-financial transactions (for resource transfers associated with loyalty programs and the like), either online or in physical stores or merchant locations.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. As used herein, a "resource allocation offer" may generally refer to an offer to provide a resource (e.g., to an entity, a user, a device, a system, and/or the like). A resource allocation offer may include attributes and/or terms, such as an amount of resources to be provided, a type of resources to be provided, a quantity of resource allocations to be provided, an entity providing the resource allocation, a type of entity providing the resource allocation offer, a type of user eligible to receive the resource allocation, a time and/or period of time for providing the resources, a condition upon which the resources will be provided, and/or the like. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source" may generally refer to an account, a system, and/or the like associated with a user and/or a type of resources (e.g., standard resources, auxiliary resources, supplementary resources, and/or the like). As used herein, a "standard source" may generally refer to a source associated with standard resources, such as a checking account, a deposit account, a savings account, a credit account, and/or the like. As used herein, an "auxiliary source" and/or a "supplementary source" may generally refer to a source associated with auxiliary resources and/or supplementary resources, such as a rewards account, a rewards points account, a benefit rewards account, a bonus miles account, a cash back account, and/or the like. Some example implementations include one or more sources associated with a user, where the one or more sources include one or more standard sources, one or more auxiliary sources, one or more supplementary sources, and/or the like. In some example implementations, an auxiliary source and/or a supplementary source associated with a user may be associated with a standard source associated with the user. For example, an entity, such as a financial entity managing the standard source and the auxiliary source, may increase a balance of auxiliary resources in the auxiliary source based on the user performing one or more actions using standard resources in the standard source (e.g., conducting a transaction and/or distribution using the standard source, maintaining a particular balance in the standard source, receiving information regarding the standard source in a particular format, and/or the like).

As used herein, a "distribution," such as a resource distribution, a standard resource distribution, an auxiliary resource distribution, and/or the like, may refer to any transaction, activities, and/or communication between one or more entities, between the user and the one or more entities, and/or the like. A resource distribution may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution may refer to one or more of: a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution using a payment instrument (credit cards, debit cards, checks, digital wallets, currency, loyalty points) and/or payment credentials (account numbers, payment instrument identifiers). A resource distribution may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," a "resource transfer," a "transaction", a "transaction event," and/or a "point of transaction event" may refer to any activity between a user, a merchant, an entity, and/or the like. In some embodiments, a resource distribution and/or transaction may refer to financial transactions involving direct or indirect movement of funds through traditional paper transaction processing systems (e.g., paper check processing) or through electronic transaction processing systems. In this regard, resource distributions and/or transactions may refer to the user initiating a purchase for a product, service, or the like from a merchant. Typical financial distributions and/or financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions. In some embodiments, a resource distribution and/or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and/or the like.

As used herein, "payment instrument" may refer to an electronic payment vehicle, such as an electronic credit, debit card, and/or the like. In some embodiments, the payment instrument may not be a "card" and may instead be account identifying information stored electronically in a user device, such as payment credentials and/or tokens and/or aliases associated with a digital wallet, account identifiers stored by a mobile application, and/or the like. In some embodiments, the term "module" with respect to an apparatus may refer to a hardware component of the apparatus, a software component of the apparatus, and/or a component of the apparatus that comprises both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like.

As used herein, a "user interface" may be an interface for user-machine interaction and may include any device or software that allows a user to input information, such as commands and/or data, into a device, and/or that allows the device to output information to the user. For example, a user interface may include a graphical user interface (GUI) and/or an interface to input computer-executable instructions that direct a processing device to carry out functions. A GUI is a type of user interface that allows users to interact with electronic devices via graphical icons and visual indicators, such as graphical widgets, graphical icons, and/or visual indicators (e.g., secondary notation), as opposed to using only text via the command line. In some embodiments, a GUI may include both graphical elements and text elements. The user interface may employ input and/or output devices to input data received from a user and/or output data to a user. Input devices and/or output devices may include a display, mouse, keyboard, button, touchpad, touch screen, microphone, speaker, LED, light, joystick, switch, buzzer, bell, and/or other devices for communicating with one or more users.

As used herein, an "engine" may refer to core elements of a computer program, part of a computer program that serves as a foundation for a larger piece of software and drives the functionality of the software, and/or the like. An engine may be self-contained, but may include externally-controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As noted herein, an entity may operate a system that hosts multiple platforms configured to perform one or more functions. Users (e.g., developers) may create applications and deploy the applications on the platforms to increase functionality of the platforms. Each application may include one or more components. In some cases, the number of applications and components operating on the platform may be very large such that identifying components and/or applications that may be causing issues on the platforms and/or that may be useful for developing another application for a similar function may be difficult for an individual. For example, when a source capability of one or more platforms is not operating properly, an individual may have difficulty identifying applications and/or components that provide, individually and/or collectively, the source capability that is not operating properly. Additionally, information about the operation of the applications may be stored in a large number of data centers, making it difficult for individuals to determine an overall picture of the operating status of a given application or a group of applications. As another example, when developing a new application to provide one or more source capabilities, an individual may have difficulty identifying applications and/or components that provide similar source capabilities, resulting in the individual and/or a team of individuals re-developing one or more components and/or applications that already exist, which consumes computing resources (e.g., processing resources, memory resources, power resources, communication resources, and/or the like) and/or network resources as well as the individual's and/or team's time, effort, and/or the like.

Some embodiments described herein provide a system, a computer program product, and/or a method for generating and maintaining source capability objects for application components. For example, a system may be configured to receive a request to initiate a development process for an application, where the request identified one or more components of the application and cause a user device to prompt a user to select, for each component of the application, one or more source capabilities from a plurality of source capabilities. In some embodiments, the source plurality of source capabilities may be based on a source function taxonomy. The system may be configured to receive, from the user device, the one or more source capabilities selected by the user for each component of the application. The system may be configured to generate, for each component of the application, a source capability object. In some embodiments, each source capability object may include information identifying the component for which the source capability object was generated and the one or more source capabilities selected by the user for the component. The system may be configured to deploy the application (e.g., in a technical environment, in a system environment, on one or more platforms, and/or the like) and store the source capability object for each component of the application in a data repository. In some embodiments, the system may be configured to deploy the application and store the source capability objects simultaneously. By prompting the user to identify source capabilities for components, generating source capability objects, and storing the source capability objects in a data repository, the system may permit the user and/or another user to identify applications and/or components associated with a source capability. For example, when a source capability of one or more platforms is not operating properly, an individual may query the data repository to identify applications and/or components that provide, individually and/or collectively, the source capability that is not operating properly. As another example, when developing a new application to provide one or more source capabilities, an individual may query the data repository to identify applications and/or components that provide similar source capabilities, thereby conserving computing resources (e.g., processing resources, memory resources, power resources, communication resources, and/or the like) and/or network resources that would otherwise be consumed by the individual and/or a team of individuals re-developing one or more components and/or applications that already exist.

FIG. 1 illustrates a block network architecture diagram illustrating a system environment 100 for generating and maintaining source capability objects for application components, in accordance with an embodiment of the invention. As illustrated, the system environment 100 includes an entity system 102 in operative communication with an application development system 104 and a user device 106. As such, the entity system 102, the application development system 104, and the user device 106 are configured to send data to and receive data from each other. The system environment 100 also includes an application database 108 and a data repository 110.

Typically, the entity system 102, the application development system 104, the user device 106, the application database 108, and the data repository 110 are in electronic communication with each other via a network 101, which may be the internet, an intranet, or the like. The network 101 is configured to establish an operative connection between otherwise incompatible devices, for example, by establishing a communication channel, automatically and in real time, between the entity system 102, the application development system 104, and/or the user device 106. In this regard, the wireless communication channel may further comprise near field communication (NFC), communication via radio waves, communication through the internet, communication via electromagnetic waves, and/or the like. For example, in FIG. 1, the network 101 may include a local area network (LAN), a wide area network (WAN), a global area network (GAN), and/or a near field communication (NFC) network. Accordingly, the network 101 may provide for wireline, wireless, or a combination of wireline and wireless communication between devices in the network 101.

The entity system 102 is associated with the entity and configured to operate one or more platforms by which one or more applications stored in the application database 108 may be operated. The entity system 102 may also store information relating to the operation of those applications in the data repository 110. The entity system 102 may store information relating to the relationship a customer has with the entity, for example, internally. The components of the entity system 102, its features, and its functions will be described in further detail below and with respect to FIG. 2, in particular.

The application development system 104 is configured to initiate, monitor, coordinate, and/or the like an application development process. For example, the application system 104 may receive requests to initiate development processes for applications, prompt users to provide input regarding applications to be developed, receive information provided by users regarding applications in development, generate source capability objects, maintain links between components of applications and source capability objects, deploy applications, store source capability objects, and/or the like. The components of the application development system 104, its features, and its functions will be described in further detail below and with respect to FIG. 4, in particular.

A user device 106 may include a computing system, such as a desktop computer, a laptop computer, and/or the like, though the user device 106 may also include a mobile communications device. For example, the user device 106 may include a cellular telecommunications device (e.g., a smartphone, a mobile phone, and/or the like), a personal digital assistant (PDA), a mobile internet accessing device, and/or the like. The user device 106 is configured to connect to the network 101, as well as receive and transmit information over the network 101. As an illustration, the user device 106 may receive information from the applicating development system 104, such as a prompt, a graphical user interface, and/or the like for displaying information and/or receiving user input, such as source capabilities, user selected source capabilities, and/or the like, as described below. The components of the user device 106, its features, and its functions will be described in further detail below and with respect to FIG. 3, in particular.

The application database 108 is configured to store one or more applications that operate on the platform(s) of the entity system 102. In some embodiments, as noted above, the entity system 102 may operate one or more software platforms configured to perform certain functions. Users may then write code to create applications configured to perform one or more additional functions. The applications may be deployed onto the software platform(s), thereby adding to the functions the software platform(s) can perform. These applications are accordingly stored in the application database 108. The application database 108 may also store metadata about the one or more applications, such as application data. In some instances, the application database 108 may be a single data storage unit, as shown in FIG. 1, while in other instances, the application database 108 may include two or more networked data storage units.

The data repository 110 is configured to store information associated with the entity, such as information relating to the operation of the one or more applications (e.g. stored in the application database 108), information regarding users, information regarding the entity, information associated with performance of applications, components, platform(s), and/or the like. Accordingly, the data repository 110 may include a number of databases, with each database storing different information about the application operations. FIG. 1 illustrates a number of exemplary databases that may make up the data repository 110. As such, in some embodiments, the data repository 110 may include a continuity database 112, a data center database 114, a compatibility database 116, a server database 118, an application performance database 120, a deployment database 122, and a source capability object database 124.

The continuity database 112 may be configured to store information on providing continuous operation of the application. For example, the continuity database 112 may store information on the recovery, testing, backup strategies, corruption strategies, operation incidents (e.g., incidents of operation outage of the application), impacts, problems, and changes for the application. To illustrate, the continuity database 112 may include a recovery point objective (RPO), an objective for the most seconds of data lost when an operation incident occurs, and a recovery time objective (RTO), an objective for the most amount of time needed to bring an application back into operation after an operation incident.

The data center database 114 may store information on the instances and locations for data centers used by the one or more applications stored in the application database 108. The compatibility database 116 may store information on present and future application compatibility. For example, for a given application, the compatibility database 116 may store information on whether the application uses any technology products that have been designated as not permitted (e.g., due to the product having a possibility of a security issue or the product being out of support from the vendor), information on whether the application has experienced configuration drift, and information and trust scores for vendors that have products used in the application. The server database 118 may store information on servers used by the one or more applications stored in the application database 108. As an example, the server database 118 may store server data, as well as server capacity and storage alerts.

The application performance database 120 may store information on the performance of the one or more applications stored in the application database 108, as well as information that affects the performance of the one or more applications. For example, the application performance database 120 may store open audit items, domain names, and platforms for the one or more applications, as well as functions performed by the entity system 102 that are affected by the application(s). The deployment database 122 may store information about the deployment of and updates for the one or more applications stored in the application database 108. As an illustration, the deployment database 122 may store capacity metrics for a next generation of applications, application release schedules, defects in application releases, onboarding metrics, and onboarding histories.

The source capability object database 124 may store source capability objects generated by the application development system 104. In some embodiments, the source capability objects may provide information on how the one or more applications relate to the business services performed by the one or more platforms of the entity system 102. For example, the source capability objects may include information identifying components of applications for which the source capability objects were generated and one or more source capabilities selected by users for the components. As another example, the source capability object database 124 may store business services and application counts involved in performing those business services, as well as mappings of the business taxonomy of the entity system 102 and how the one or more application(s) fit into the mapping.

Databases 112-124 are exemplary and, in some embodiments, additional, fewer, or different databases may be included as part of the system environment 100. In some embodiments, each of the databases 112-124 may be a single data storage unit, as shown in FIG. 1. Additionally, or alternatively, one or more of the databases 112-124 may be comprised of two or more networked data storage units (e.g., in some cases, with each of the networked data storage units storing different subcategories of data) and/or one or more of the databases 112-124 may be combined into a single database.

FIG. 2 illustrates a block diagram 200 of the entity system 102, in accordance with some embodiments of the invention. As shown in FIG. 2, the entity system 102 may include a communication device 202, a processing device 204, and a memory device 206 having application platform(s) 210 and a processing datastore 212 stored therein. As shown, the processing device 204 is operatively connected to and configured to control and cause the communication device 202 and the memory device 206 to perform one or more functions. In some embodiments, the application platform(s) 210 comprise computer-readable instructions 208 (e.g., computer-readable code) that when executed by the processing device 204 cause the processing device 204 to perform one or more functions. For example, the application platform(s) 210 may include a computer-readable program code having one or more executable portions. In some embodiments, the application platform(s) 210 may be executable to initiate, perform, complete, and/or facilitate one or more portions of any embodiments described and/or contemplated herein.

The communication device 202 may generally include a modem, server, transceiver, and/or other device for communicating with other devices on the network 101. In some embodiments, the communication device 202 may be a communication interface having one or more communication devices configured to communicate with one or more devices on the network 101, such as the application development system 104, the user device 106, the application database 108, and the data repository 110. The communicative connection to one or more devices on the network 101 may be via a wired or wireless connection. In this regard, the wireless communication channel may comprise near field communication (NFC), communication via radio waves, communication through the internet, communication via electromagnetic waves, communication via applicable cellular systems of wireless telephone networks, and/or the like.

In some embodiments, and referring to the entity system 102 illustrated in FIG. 2, the processing device 204 may generally refer to a device or combination of devices having circuitry used for implementing the communication and/or logic functions of the processing device 204. For example, the processing device 204 may include a control unit, a digital signal processor device, a microprocessor device, analog-to-digital converters, digital-to-analog converters, support circuits, and/or the like. Control and signal processing of the entity system 102 may be allocated between multiple processing devices according to their respective capabilities. The processing device 204 may include functionality to operate one or more software programs based on computer-readable instructions 208 thereof, which may be stored in the memory device 206, such as the application platform(s) 210.

As the phrase is used herein, a processing device may be "configured to" perform a certain function in a variety of ways, including, for example, by having one or more general-purpose circuits perform the function by executing particular computer-executable program code embodied in a computer-readable medium, by having one or more application-specific circuits perform the function, and/or the like. In some embodiments, the processing device 204 may be configured to use the network communication interface of the communication device 202 to transmit and/or receive data and/or commands to and/or from the other devices/systems connected to the network 101.

The memory device 206 within the entity system 102 may generally refer to a device and/or a combination of devices with one or more forms of computer-readable media for storing data and/or computer-executable program code/instructions. For example, the memory device 206 may include any computer memory that provides an actual and/or virtual space to temporarily or permanently store data and/or commands provided to the processing device 204 when it carries out the functions described herein.

The entity system 102 may further include a data repository 214 comprising authentication data 216 and account data 218. The processing device 204 may utilize the authentication data 216 to validate authentication credentials of customers attempting, for example, to check a balance of an account and/or technology resource held with the entity. The account data 218 may reflect current account data for various customers of the entity or, in some embodiments, different data that a user or customer of the entity may request to access.

In some embodiments, the application platform(s) 210 may comprise computer-readable instructions associated with one or more platforms, where each platform performs one or more functions. Additionally, or alternatively, one or more applications may be deployed onto each platform that expand the functions that can be performed by the platform. In some embodiments, each application deployed onto the application platform(s) 210 may include one or more components. In some embodiments, the application platform(s) 210 may be stored in the processing datastore 212. In some embodiments, the application platform(s) 210 may include computer-readable instructions that, when executed by the processing device 204, cause the processing device 204 to perform one or more actions and/or transmit control instructions to other components or devices to generate the application platform(s). In some embodiments, the application platform(s) 210 may be implemented as a centralized module (e.g., as shown in FIG. 2), as a series of connected modules or applications that form the platform(s), and/or the like. It should be understood that the discussion of a platform of the entity system 102 herein may refer to a single platform or may refer to multiple platforms.

FIG. 3 illustrates a block diagram 300 of the user device 106, in accordance with some embodiments of the invention. As shown in FIG. 3, the user device 106 may include a communication device 302, a processing device 304, and a memory device 306. As shown in FIG. 3, the memory device 306 may include an application development framework 310 and a processing datastore 312 (e.g., stored therein). As shown, the processing device 304 may be operatively connected to and/or configured to control and/or cause the communication device 302 and/or the memory device 306 to perform one or more functions. In some embodiments, the application development framework 310 may include computer-readable instructions and/or computer-readable code that, when executed by the processing device 304, cause the processing device 304 to perform one or more functions. For example, the application development framework 310 may include computer-readable program code having one or more executable portions. In some embodiments, the application development framework 310 may be executable to initiate, perform, complete, and/or facilitate one or more portions of any embodiments described and/or contemplated herein.

The communication device 302 may include a modem, server, transceiver, and/or the like for communicating with other devices on the network 101. In some embodiments, the communication device 302 may be a communication interface having one or more communication devices configured to communicate with one or more devices on the network 101, such as the entity system 102, the application development system 104, the application database 108, and the data repository 110. As such, the communicative connection of the communication device 302 may be a wired and/or wireless connection similar to the implementation of the communication device 202 of the block diagram 200 of the entity system 102.

Referring to the user device 106 illustrated in FIG. 3, the processing device 304 may generally refer to a device or combination of devices having circuitry used for implementing the communication and/or logic functions of the processing device 304. In this way, the processing device 304 may be configured similarly to the processing device 204 of the block diagram 200 of the entity system 102. Additionally, the processing device 304 may further include functionality to operate one or more software programs based on computer-readable instructions 308, which may be stored in the memory device 306, such as the application development framework 310. The processing device 304 may also be configured to use the network communication interface of the communication device 302 to transmit and/or receive data and/or commands to and/or from the other devices/systems connected to the network 101, similar to the processing device 204 of the entity system 102.

The memory device 306 within the user device 106 may generally refer to a device and/or combination of devices with one or more forms of computer-readable media for storing data and/or computer-executable program instructions. For example, the memory device 306 may include computer memory that provides an actual or virtual space to temporarily or permanently store data and/or commands provided to the processing device 304 when it carries out the functions described herein, similar to the memory device 206 of the block diagram 200 of the entity system 102.

In some embodiments, the application development framework 310 may comprise computer-readable instructions associated with generating one or more application development platforms, and/or the computer-readable instructions associated with generating an application development platform(s) may be stored in the processing datastore 312, in some embodiments. More specifically, generating an application development platform may include operating a software platform that facilitates a user, such as an application developer, in developing one or more applications that may be deployed onto a platform of the entity system 102 (e.g., the application platform(s) 210). The application development framework 310 may be a framework that can be used to create applications for a variety of platforms and/or functionalities, and/or the application development framework 310 may be a framework specific to creating applications for the application platform(s) 210 of the entity system 102 and/or that is directed to creating applications for a specific type of functionality. In some embodiments, the application development framework 310 comprises computer-readable instructions that, when executed by the processing device 304, cause the processing device 304 to perform one or more functions and/or transmit control instructions to other components and/or devices to generate the application development framework described herein.

FIG. 4 illustrates a block diagram 400 of the application development system 104, in accordance with some embodiments of the invention. As illustrated in FIG. 4, the application development system 104 may include a communication device 402, a processing device 404, and a memory device 406. In some embodiments, the memory device 406 may include a requirements management application 410, a configuration management application 412, a collaboration application 414, a build automation application 416, and a deployment automation application 418 (e.g., stored therein). As shown, the processing device 404 is operatively connected to and/or configured to control and/or cause the communication device 402 and/or the memory device 406 to perform one or more functions. In some embodiments, the requirements management application 410, the configuration management application 412, the collaboration application 414, the build automation application 416, and/or the deployment automation application 418 includes computer-readable instructions and/or computer-readable code that, when executed by the processing device 404, cause the processing device 404 to perform one or more functions. For example, the requirements management application 410, the configuration management application 412, the collaboration application 414, the build automation application 416, and/or the deployment automation application 418 may include a computer-readable program code having one or more executable portions. In some embodiments, the requirements management application 410, the configuration management application 412, the collaboration application 414, the build automation application 416, and/or the deployment automation application 418 may be executable to initiate, perform, complete, and/or facilitate one or more portions of any embodiments described and/or contemplated herein.

The communication device 402 may generally include a modem, server, transceiver, and/or the like for communicating with other devices on the network 101. In some embodiments, the communication device 402 may be a communication interface having one or more communication devices configured to communicate with one or more devices on the network 101, such as the entity system 102, the user device 106, the application database 108, and the data repository 110. As such, the communicative connection of the communication device 402 may be a wired and/or wireless connection similar to the implementation of the communication device 202 of the block diagram 200 of the entity system 102.

Referring to the application development system 104 illustrated in FIG. 4, the processing device 404 may generally refer to a device or combination of devices having circuitry used for implementing the communication and/or logic functions of the processing device 404. In this way, the processing device 404 may be configured similarly to the processing device 204 of the block diagram 200 of the entity system 102. Additionally, the processing device 404 may further include functionality to operate one or more software programs based on computer-readable instructions 408 thereof, which may be stored in the memory device 406, such as the requirements management application 410, the configuration management application 412, the collaboration application 414, the build automation application 416, the deployment automation application 418, and/or the like. The processing device 404 may also be configured to use the network communication interface of the communication device 402 to transmit and/or receive data and/or commands to and/or from the other devices/systems connected to the network 101, similar to the processing device 204 of the entity system 102.

The memory device 406 within the application development system 104 may generally refer to a device and/or combination of devices that store one or more forms of computer-readable media for storing data and/or computer-executable program instructions. For example, the memory device 406 may include any computer memory that provides an actual and/or virtual space to temporarily and/or permanently store data and/or commands provided to the processing device 404 when it carries out the functions described herein, similar to the memory device 206 of the block diagram 200 of the entity system 102.

The application development system 104 may further include a source capability repository 420 including source capability objects 422. The processing device 404 may generate source capability objects 422 for applications and/or components of applications being developed and may store the source capability objects 422 in the source capability repository 420, as described in further detail below.

In some embodiments, the requirements management application 410 may include computer-readable instructions associated with one or more steps of receiving, from one or more user devices, data and/or information associated with applications and/or components to be developed by one or more users, maintaining links between applications and/or components and corresponding source objects (e.g., during a development process), and/or the like. Additionally, or alternatively, the requirements management application 410 may include computer-readable instructions associated with one or more steps of receiving, from one or more user devices, requests to initiate development processes for applications (e.g., including one or more components). For example, the requirements management application 410 may include computer-readable instructions associated with receiving stories from users, mapping stories to applications and/or components, and/or the like. The requirements management application 410 may be embodied within the configuration management application 412, the collaboration application 414, the build automation application 416, and/or the deployment automation application 418, or vice versa. In some embodiments, the requirements management application 410 may include computer-readable instructions that, when executed by the processing device 404, cause the processing device 404 to perform one or more functions and/or transmit control instructions to other components and/or devices to perform one or more data actions described herein. Additionally, or alternatively, the requirements management application 410 may include computer-readable instructions associated with one or more steps described herein with respect to the configuration management application 412, the collaboration application 414, the build automation application 416, the deployment automation application 418, and/or the like.

In some embodiments, the configuration management application 412 may include computer-readable instructions associated with one or more steps described herein with respect to causing user devices to prompt users to select, for each component of an application, one or more source capabilities from a plurality of source capabilities. For example, the configuration management application 412 may include computer-readable instructions associated with, in response to receiving a request to initiate an application development process, where the request includes components of an application to be developed, causing a user device associated with the request to prompt a user of the user device to select, for each component of an application, at least one source capability from a list of source capabilities. In some embodiments, the plurality of source capabilities may be based on a source function taxonomy (e.g., a business function taxonomy).

In some embodiments, the configuration management application 412 may include computer-readable instructions associated with one or more steps of receiving, from user devices, the source capabilities selected by the user for each component of the application. Additionally, or alternatively, the configuration management application 412 may include computer-readable instructions associated with one or more steps of mapping the source capabilities selected by the user to components of the application. In some embodiments, the configuration management application 412 may include computer-readable instructions that, when executed by the processing device 404, cause the processing device 404 to perform one or more functions and/or transmit control instructions to other components and/or devices to perform one or more data actions described herein. Additionally, or alternatively, the configuration management application 412 may include computer-readable instructions associated with one or more steps described herein with respect to the requirements management application 410, the collaboration application 414, the build automation application 416, the deployment automation application 418, and/or the like.

In some embodiments, the collaboration application 414 may include computer-readable instructions associated with one or more steps of generating, for each component of the application, a source capability object. For example, each source capability object may include information identifying a component for which the source capability object was generated and the one or more source capabilities selected by the user for the component. In some embodiments, the collaboration application 414 may include computer-readable instructions associated with one or more steps of maintaining a link between each component and one or more source objects generated for the component during the application development process. Additionally, or alternatively, the collaboration application 414 may include computer-readable instructions associated with one or more steps of storing the source objects in source capability repository 420 as source capability objects 422. In some embodiments, the collaboration application 414 may include computer-readable instructions that, when executed by the processing device 404, cause the processing device 404 to perform one or more functions and/or transmit control instructions to other components and/or devices to perform one or more data actions described herein. Additionally, or alternatively, the collaboration application 414 may include computer-readable instructions associated with one or more steps described herein with respect to the requirements management application 410, the configuration management application 412, the build automation application 416, the deployment automation application 418, and/or the like.

In some embodiments, the build automation application 416 may include computer-readable instructions associated with one or more steps of creating a deployable package for an application (e.g., during the development process). For example, the build automation application 416 may include computer-readable instructions associated with one or more steps of receiving from user devices and/or providing to user devices information and/or data regarding an application being developed, automating one or more steps of the application development process, and/or the like. In some embodiments, the build automation application 416 may include computer-readable instructions that, when executed by the processing device 404, cause the processing device 404 to perform one or more functions and/or transmit control instructions to other components and/or devices to perform one or more data actions described herein. Additionally, or alternatively, the build automation application 416 may include computer-readable instructions associated with one or more steps described herein with respect to the requirements management application 410, the configuration management application 412, the collaboration application 414, the deployment automation application 418, and/or the like.

In some embodiments, the deployment automation application 418 may include computer-readable instructions associated with one or more steps of deploying an application (e.g., at an end of the development process), storing source capability objects for components of an application (e.g., in a data repository), and/or the like. For example, the deployment automation application 418 may include computer-readable instructions associated with one or more steps of deploying an application on a server (e.g., the entity system 102 and/or the like), one or more platforms, and/or the like. As another example, the deployment automation application 418 may include computer-readable instructions associated with one or more steps of providing (e.g., simultaneously with deploying an application) source capability objects for components of an application to an artifact repository for transmission to and/or access by a data lake, an application monitoring system, and/or the like. In some embodiments, the deployment automation application 418 may include computer-readable instructions that, when executed by the processing device 404, cause the processing device 404 to perform one or more functions and/or transmit control instructions to other components and/or devices to perform one or more data actions described herein. Additionally, or alternatively, the deployment automation application 418 may include computer-readable instructions associated with one or more steps described herein with respect to the requirements management application 410, the configuration management application 412, the collaboration application 414, the build automation application 416, and/or the like.

As shown in FIGS. 1, 2, 3, and 4, the entity system 102, the application development system 104, and the user device 106 may be separate systems. In some embodiments, the entity system 102, the application development system 104, and/or the user device 106 may be implemented partially or entirely as the same system. For example, the entity system 102 may be implemented as a series of networked servers that also host computer-readable code configured to be executed to perform the functions of the application development system 104 as described herein (e.g., with respect to FIG. 5 and/or the like).

FIG. 5 illustrates a process flow 500 for generating and maintaining source capability objects for application components, in accordance with an embodiment of the invention. As shown in block 502, the process flow may include receiving, from a user device associated with a user, a request to initiate a development process for an application, wherein the request identifies one or more components of the application. For example, a system (e.g., similar to one or more of the systems described herein with respect to FIGS. 1-4) may receive, from a user device associated with a user, a request to initiate a development process for an application. In some embodiments, the request may include information identifying one or more components of the application, a purpose of the application, an input of the application, an output of the application, a function of the application, and/or the like. For example, the request may be a story for the application submitted to a project management and/or bug tracking platform and/or application (e.g., a requirements management application, such as the requirements management application 410 described herein with respect to FIG. 4, and/or the like).

In some embodiments, the process flow may include initiating, based on receiving the request, a development process for the application using a project management application and/or project management platform. For example, a system (e.g., similar to one or more of the systems described herein with respect to FIGS. 1-4) may initiate (e.g., using a requirements management application, such as the requirements management application 410 described herein with respect to FIG. 4, and/or the like) a development process for the application.

As shown in block 504, the process flow may include causing, based on receiving the request to initiate the development process, the user device to prompt the user to select, for each component of the application, one or more source capabilities from a plurality of source capabilities, wherein the plurality of source capabilities is based on a source function taxonomy. For example, a system (e.g., similar to one or more of the systems described herein with respect to FIGS. 1-4) may cause the user device to prompt the user to select, for each component of the application, one or more source capabilities from a plurality of source capabilities. In some embodiments, the plurality of source capabilities is based on a source function taxonomy, where the source function taxonomy includes a list of source functions, resource functions, computer functions, network functions, business functions, and/or the like that one or more applications may provide to an entity and/or users associated with an entity. For example, the source function taxonomy may include a plurality of categories of business functions (e.g., product administration, transacting, onboarding, relationship administration, global markets, servicing, communications, and/or the like), a plurality of general business functions (e.g., transaction initiation, transaction enablement, client treasury services, customer/client relationship administration, and/or the like), and/or a plurality of specific business functions (e.g., funds transfer, payments, purchase, deposits/withdrawals, deal processing, financial transaction processing, clearing and settlement, account initiation management, agreements management, and/or the like). In some embodiments, the process flow may include selecting the source function taxonomy from a plurality of source function taxonomies used by an entity.

In some embodiments, causing the user device to prompt the user may include causing the user device to display a plurality of source capabilities for selection by the user. For example, the system may cause the user device to display a graphical user interface including, for each component of the application, a list, a droplist, a menu, and/or the like of the plurality of source capabilities. In some embodiments, the user may select one or more source capabilities via the graphical user interface. Additionally, or alternatively, the graphical user interface may include, for each component of the application, a text box for the user to input one or more source capabilities.

As shown in block 506, the process flow may include receiving, from the user device and for each component of the application, the one or more source capabilities selected by the user. For example, the user device may receive input from the user selecting one or more source capabilities for each component of the application and transmit the selected source capabilities for each component of the application to a system (e.g., similar to one or more of the systems described herein with respect to FIGS. 1-4). The system may receive the selected source capabilities for each component of the application (e.g., using a configuration management application, such as the configuration management application 412 shown in and described herein with respect to FIG. 4, and/or the like).

In some embodiments, the process flow may include importing and/or creating mapping of components to source capabilities (e.g., into the development process). For example, a system (e.g., similar to one or more of the systems described herein with respect to FIGS. 1-4) may import and/or create mapping of components to source capabilities (e.g., using a configuration management application, such as the configuration management application 412 shown in and described herein with respect to FIG. 4, and/or the like).

In some embodiments, the process flow may include repeatedly, until the user has selected at least one source capability for each component of the application, causing the user device to prompt the user to select, for each component of the application, one or more source capabilities from a plurality of source capabilities and receiving the selected source capabilities. For example, if the user failed to select a source capability for a component of the application, the process flow may include causing the user device to prompt the user to select one or more source capabilities for the component. In this way, the process may provide a gate function to the development process, whereby the user may not proceed beyond a stage of the development process until at least one source capability has been selected for each component of the application.

As shown in block 508, the process flow may include generating, for each component of the application, a source capability object, wherein each source capability object comprises information identifying a component for which the source capability object was generated and the one or more source capabilities selected by the user for the component. For example, a system (e.g., similar to one or more of the systems described herein with respect to FIGS. 1-4) may generate, for each component of the application, a source capability object (e.g., using a collaboration application, such as the collaboration application 414 shown in and described herein with respect to FIG. 4, and/or the like). In some embodiments, each source capability object may include information identifying a component for which the source capability object was generated, the one or more source capabilities selected by the user for the component, and/or the like. In some embodiments, a source capability object may be and/or include a record, an extensible markup language file, and enterprise application archive, and/or the like, and may include data identifying the component for which the source capability object was generated, the one or more source capabilities selected by the user for the component, and/or the like. In some embodiments, a source capability object may include information identifying a user, a team, an entity, a division of an entity, and/or the like to be contacted in the event that the component for which the source capability object was generated is not functioning properly. Additionally, or alternatively, a source capability object may be and/or include a metadata object, a file, and/or the like that may be deployed and/or accessed from a plurality of systems and/or devices in one or more system environments. In some embodiments, a source capability object may include payload attributes, such as an event identifier, a source capability, an application identifier, an SPK identifier, a component, a description, an accountable support, a location, a server type, and/or the like.

In some embodiments, the process flow may include maintaining, during the development process and for each component of the application, a link between a component of the application and the source capability object generated for the component of the application. For example, the link may be a cross-reference between the component and its corresponding source capability object. In some embodiments, maintaining the link may include removing, based on a component being removed from the application, a source capability object corresponding to the component removed from the application from a data repository (e.g., a source capability repository), where the data repository may store source capability objects associated with the application. By removing the source capability object from the data repository, the data repository may include only source capability objects associated with components of the application being developed during the development process. In this way, the data repository may include source capability objects including information that accurately identifies source capabilities of the application.

In some embodiments, the process flow may include receiving, during the development process (e.g., from the user device, from another user device, and/or the like), a request to add another component to the application. For example, a user, during the development process, may add another component to the application (e.g., that was not originally planned to be included in the application).

In some embodiments, the process flow may include causing, based on receiving the request to add the other component to the application, a user device to prompt the user to select, for the other component of the application, one or more source capabilities from the plurality of source capabilities. For example, the process flow may include causing a user device to prompt the user in a manner similar to that described herein with respect to block 504.

In some embodiments, the process flow may include, receiving (e.g., from a user device) the one or more source capabilities selected by a user for the other component of the application. For example, the process flow may include receiving the one or more source capabilities selected for the other component of the application in a manner similar to that described herein with respect to block 506.

In some embodiments, the process flow may include, generating, for the other component of the application, another source capability object comprising information identifying the other component of the application and the one or more source capabilities selected by the user for the other component. For example, the process flow may include generating another source capability object for the other component of the application in a manner similar to that described herein with respect to block 508.

In some embodiments, the process flow may include creating, for the application, a deployable package. For example, a system (e.g., similar to one or more of the systems described herein with respect to FIGS. 1-4) may create a deployable package for the application (e.g., using a build automation application, such as the build automation application 416 shown in and described herein with respect to FIG. 4, and/or the like).

As shown in block 510, the process flow may include deploying, at an end of the development process, the application. For example, a system (e.g., similar to one or more of the systems described herein with respect to FIGS. 1-4) may deploy the application (e.g., using a deployment automation application, such as the deployment automation application 418 shown in and described herein with respect to FIG. 4, and/or the like). In some embodiments, the process flow may including deploying the application on a server (e.g., the entity system 102 and/or the like), one or more platforms, and/or the like.

As shown in block 512, the process flow may include storing, based on deploying the application, the source capability object for each component of the application in a data repository. For example, a system (e.g., similar to one or more of the systems described herein with respect to FIGS. 1-4) may store (e.g., at the same time as deploying the application) the source capability object for each component of the application in a data repository (e.g., using a deployment automation application, such as the deployment automation application 418 shown in and described herein with respect to FIG. 4, and/or the like). In some embodiments, storing the source capability object for each component of the application may include providing (e.g., simultaneously with deploying an application) source capability objects for components of the application to an artifact repository for transmission to and/or access by a data lake, to an application monitoring system (e.g., for monitoring stability, functioning, health, and/or the like of one or more applications, platforms, systems, system environments, and/or the like), and/or the like.

In some embodiments, a system (e.g., similar to one or more of the systems described herein with respect to FIGS. 1-4) may receive, from another user device, a notification that a first source capability, of the plurality of source capabilities, is not functioning properly. Additionally, or alternatively, the system may query, based on the notification, source capability objects stored in the data repository to obtain a report identifying components associated with the first source capability. In some embodiments, the system may provide the report to the other user device. In this way, the source capability objects stored in the data repository may provide a queryable data source that may identify components of applications associated with source capabilities, such that, when a source capability is not functioning properly, potentially malfunctioning components may be readily identified. Additionally, or alternatively, the source capability objects stored in the data repository may be discoverable (e.g., at the time of deployment), such that the source capability objects may be discovered and user to generate maps, flows, diagrams, and/or the like.

In some embodiments, a system (e.g., similar to one or more of the systems described herein with respect to FIGS. 1-4) may receive, from another user device, a list of source capabilities associated with another planned application and may query, based on the list of source capabilities, source capability objects stored in the data repository to obtain a report identifying components associated with each source capability of the list of source capabilities. For example, a user planning to develop an application to support a list of source capabilities (e.g., business functions) may query the source capability objects stored in the data repository to identify previously developed components associated with the list of source capabilities. As another example, a user planning to develop an application to support a new source capability may determine that another source capability is similar to the new source capability and may query source capability objects stored in the data repository for the other source capability to identify components of applications upon which the application for supporting the new source capability may be based. In this way, the source capability objects stored in the data repository may provide a queryable data source that may identify potentially useful, previously developed components for use in new applications and/or to support new source capabilities, thereby preventing the duplication of effort, time, computing resources, network resources, and/or the like to develop a new component similar to an existing component.

In some embodiments, the source capability objects stored in the data repository may be used to cross-reference log records, build systems integration diagrams, create an end-to-end view, which can be referenced via query and/or dashboard (e.g., by interested parties, production incident triage teams operating under duress, and/or the like). Additionally, or alternatively, the source capability objects stored in the data repository maintain an initial source capability focus (e.g., business function focus) during the development process, after deployment, and/or the like.

In some embodiments, a system (e.g., a monitoring system, a system similar to one or more of the systems described herein with respect to FIGS. 1-4, and/or the like) may monitor a plurality of applications, where each application includes one or more components having corresponding source capability objects stored in the data repository, and may determine, based on monitoring the plurality of applications, that components of a set of components are not functioning properly. Additionally, or alternatively, the system may query, based on the set of components, source capability objects stored in the data repository to obtain a report identifying a set of source capabilities associated with the set of components and may provide a notification to one or more user devices, systems, and/or the like identifying the set of source capabilities. For example, a monitoring system may monitor applications, determine that a set of components is not functioning properly, query source capability objects to identify a set of source capabilities associated with the set of components, and provide one or more notifications to a user device, a system, an entity, and/or the like that may be impacted by the improper functioning of the set of components. As another example, the monitoring system may identify, based on information in the source capability objects, a user, a team, an entity, a division of an entity, and/or the like to be contacted in the event that the components are not functioning properly and may provide a notification to the identified user, team, entity, division of an entity, and/or the like.

In some embodiments, a system (e.g., a monitoring system, a system similar to one or more of the systems described herein with respect to FIGS. 1-4, and/or the like) may predict that a source capability is going to fail using machine learning and/or a machine learning model. For example, the system may provide attributes (e.g., demand, resources used, resources required, capacity, associated source capabilities, and/or the like) of applications and/or components running on one or more platforms to a machine learning model trained (e.g., using historical data associated with previous performance of applications and/or components) to output a likelihood of a source capability failing.

In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, an LDA, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system can additionally or alternatively leverage a probabilistic module, heuristic module, deterministic module, or any other suitable module leveraging any other suitable computation method, machine learning method or combination thereof. However, any suitable machine learning approach can otherwise be incorporated in the system. Further, any suitable model (e.g., machine learning, non-machine learning, etc.) can be used in generating data relevant to the system. In some embodiments, the one or more machine learning algorithms may be predictive modeling algorithms configured to use data and statistics to predict outcomes with forecasting models.

In some embodiments, the machine learning model may be generated by training on data regarding component and/or application demand, resources used by components and/or applications, resources required by components and/or applications, capacity of components and/or applications, source capabilities associated with components and/or applications, and/or the like over a predetermined past period of time. In doing so, the system may be configured to determine, for a source capability, a likelihood of failure associated with the source capability. In some embodiments, the one or more machine learning algorithms may be used to calculate the likelihood of the source capability failing and whether the likelihood satisfies a threshold.

An entity may employ business individuals, application designers, and technology engineers. In some embodiments, the business individuals, the application designers, and the technology engineers may use different terminology to describe data processing and/or technology in general, and may not have a common understanding of each other's terminologies. For example, business individuals may communicate based on a source function taxonomy that includes business functions, and/or the like that one or more applications may provide to an entity and/or users associated with an entity. The source function taxonomy may include, for example, a plurality of categories of business functions (e.g., product administration, transacting, onboarding, relationship administration, global markets, servicing, communications, and/or the like), a plurality of general business functions (e.g., transaction initiation, transaction enablement, client treasury services, customer/client relationship administration, and/or the like), and/or a plurality of specific business functions (e.g., funds transfer, payments, purchase, deposits/withdrawals, deal processing, financial transaction processing, clearing and settlement, account initiation management, agreements management, and/or the like). The application designers (e.g., functional technologists) may communicate based on a terminology that includes platforms, applications, instances of applications, workflows, information exchanges, systems, and/or the like as well as relationships describing the inputs, outputs, data flows, and/or the like of such components. The technology engineers (e.g., infrastructure technologists) may communicate based on a physical topology including geography, data center, hardware type, hardware instances (e.g., servers, virtual machines, nodes, partitions, and/or the like), operating systems (e.g., on hardware), network connectivity, and/or the like. Given the different communicate terminologies, the business individuals, the application designers, and the technology engineers may exchange written explanations in the form of requirements and presentations and expect each group to apply its expertise to the identified goal.

Source capabilities (e.g., business functions, business capabilities, business services, and/or the like) may be important to the entity, but specific identification of such source capabilities may be fluid as to specific identification and technology composition. In some embodiments, data scientists may apply taxonomies to organize source capabilities as a baseline for structuring organizations, strategies, and/or the like. Application designers and/or technology engineers may operate at a more specific level of creating software to execute specific tasks, which include parts of source capabilities. Furthermore, application designers and/or technology engineers attempt to deploy the software (e.g., executables) on appropriate hardware utilizing common operating database management and/or network systems. Each group may maintain documentation describing their specific area of expertise with a high level reference to source capability; however, such documentation cannot serve as domain and/or enterprise reference data.

Some implementations described herein provide a complementary process within a software development process that generates useful system documentation that combines business, application, and infrastructure data into a deployable metadata object for flexible use. The process may include selecting a taxonomy (e.g., a source capability taxonomy), associating components with source capabilities, and deploying artifacts to support monitoring, issue triage, solution design, and reference. The metadata objects/artifacts/source objects may include information identifying source capabilities of components (e.g., which may correspond to business individuals' terminology) and/or information identifying physical topology supporting the components (e.g., which may correspond to technology engineers' terminology).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for generating and maintaining source capability objects for application components, the system comprising:
    at least one non-transitory storage device; and
    at least one processing device coupled to the at least one non-transitory storage device, wherein the at least one processing device is configured to:
    receive, from a user device associated with a user, a request to initiate a development process for an application, wherein the request to initiate the development process identifies one or more components of the application, and wherein the request to initiate the development process comprises information identifying an input, an output, and a function of the application;
    based on receiving the request to initiate the development process, repeatedly and until the user has selected at least one source capability for each component of the application, cause the user device to prompt the user to select, for each component of the application, one or more source capabilities from a plurality of source capabilities, wherein the plurality of source capabilities is based on a source function taxonomy, wherein the source function taxonomy comprises a list of source functions, resource functions, computer functions, network functions, and business functions that one or more applications provide, and wherein causing the user device to prompt the user to select, for each component of the application, the one or more source capabilities from the plurality of source capabilities comprises causing the user device to display a graphical user interface;
    receive, from the user device via the graphical user interface and for each component of the application, the one or more source capabilities selected by the user;
    receive, from another user device, a list of source capabilities associated with another planned application;
    query, based on the list of source capabilities, source capability objects in a data repository to obtain a report identifying components associated with each source capability of the list of source capabilities;
    query, during the development process, the data repository to identify previously developed components corresponding to a subset of the one or more source capabilities selected by the user, wherein the data repository comprises source capability objects previously generated for previously developed components of other previously developed applications;
    generate, for each component of the application not having a corresponding previously developed component in the data repository, a source capability object, wherein the source capability object comprises a metadata object deployable and accessible from a plurality of systems and devices in multiple system environments, and wherein the source capability object comprises information identifying a component for which the source capability object was generated and the one or more source capabilities selected by the user for the component;
    deploy, at an end of the development process, the application;
    store, based on deploying the application, the source capability object for each component of the application in the data repository;
    predict, after deploying the application, using a machine learning model, and for each component of the application, whether each source capability of the one or more source capabilities selected by the user for the component of the application is going to fail;
    receive, after deploying the application, a request to add an additional component to the application;
    cause, after deploying the application and based on receiving the request to add the additional component to the application, the user device to prompt the user to select, for the additional component of the application, one or more additional source capabilities from the plurality of source capabilities;
    receive, after deploying the application and from the user device, the one or more additional source capabilities selected by the user for the additional component of the application; and
    generate, after deploying the application and for the additional component of the application, another source capability object comprising information identifying the additional component of the application and the one or more additional source capabilities selected by the user for the additional component.

2. The system of claim 1, wherein the request to initiate the development process comprises information identifying a purpose of the application.

3. The system of claim 1, wherein the at least one processing device is configured to initiate, based on receiving the request to initiate the development process, the development process for the application using a project management application.

4. The system of claim 1, wherein the at least one processing device is configured to, when causing the user device to prompt the user to select, for each component of the application, the one or more source capabilities from the plurality of source capabilities, cause the user device to display the plurality of source capabilities for selection by the user.

5. The system of claim 1, wherein each source capability object comprises an extensible markup language file.

6. The system of claim 1, wherein the at least one processing device is further configured to maintain, during the development process and for each component of the application, a link between a component of the application and the source capability object generated for the component of the application.

7. The system of claim 1, wherein the at least one processing device is further configured to:
    receive, during the development process and from the user device, a new request to add a new component to the application;
    cause, based on receiving the new request to add the new component to the application, the user device to prompt the user to select, for the new component of the application, one or more source capabilities from the plurality of source capabilities;

receive, from the user device, the one or more source capabilities selected by the user for the new component of the application; and generate, for the new component of the application, a new source capability object comprising information identifying the new component of the application and the one or more source capabilities selected by the user for the new component.

8. The system of claim 1, wherein the at least one processing device is further configured to:

receive, from the another user device, a notification that a first source capability of the plurality of source capabilities, is not functioning properly;

query, based on the notification, source capability objects stored in the data repository to obtain a report identifying components associated with the first source capability; and provide the report to the another user device.

9. The system of claim 1, wherein the at least one processing device is further configured to:

monitor a plurality of applications, wherein each application comprises one or more components having corresponding source capability objects stored in the data repository;

determine, based on monitoring the plurality of applications, that components of a set of components are not functioning properly;

query, based on the set of components, source capability objects stored in the data repository to obtain a report identifying a set of source capabilities associated with the set of components; and provide a notification to one or more user devices identifying the set of source capabilities.

10. A computer program product for generating and maintaining source capability objects for application components, the computer program product comprising a non-transitory computer-readable medium comprising code causing a first apparatus to:

receive, from a user device associated with a user, a request to initiate a development process for an application, wherein the request to initiate the development process identifies one or more components of the application, and wherein the request to initiate the development process comprises information identifying an input, an output, and a function of the application;

based on receiving the request to initiate the development process, repeatedly and until the user has selected at least one source capability for each component of the application, cause the user device to prompt the user to select, for each component of the application, one or more source capabilities from a plurality of source capabilities, wherein the plurality of source capabilities is based on a source function taxonomy, wherein the source function taxonomy comprises a list of source functions, resource functions, computer functions, network functions, and business functions that one or more applications provide, and wherein causing the user device to prompt the user to select, for each component of the application, the one or more source capabilities from the plurality of source capabilities comprises causing the user device to display a graphical user interface;

receive, from the user device via the graphical user interface and for each component of the application, the one or more source capabilities selected by the user;

receive, from another user device, a list of source capabilities associated with another planned application;

query, based on the list of source capabilities, source capability objects stored in a data repository to obtain a report identifying components associated with each source capability of the list of source capabilities;

query, during the development process, the data repository to identify previously developed components corresponding to a subset of the one or more source capabilities selected by the user, wherein the data repository comprises source capability objects previously generated for previously developed components of other previously developed applications:

generate, for each component of the application not having a corresponding previously developed component in the data repository, a source capability object, wherein the source capability object comprises a metadata object deployable and accessible from a plurality of systems and devices in multiple system environments, and wherein the source capability object comprises information identifying a component for which the source capability object was generated and the one or more source capabilities selected by the user for the component;

deploy, at an end of the development process, the application;

store, based on deploying the application, the source capability object for each component of the application in the data repository;

predict, after deploying the application, using a machine learning model, and for each component of the application, whether each source capability of the one or more source capabilities selected by the user for the component of the application is going to fail;

receive, after deploying the application, a request to add an additional component to the application;

cause, after deploying the application and based on receiving the request to add the additional component to the application, the user device to prompt the user to select, for the additional component of the application, one or more additional source capabilities from the plurality of source capabilities;

receive, after deploying the application and from the user device, the one or more additional source capabilities selected by the user for the additional component of the application; and generate, after deploying the application and for the additional component of the application, another source capability object comprising information identifying the additional component of the application and the one or more additional source capabilities selected by the user for the additional component.

11. The computer program product of claim 10, wherein the request to initiate the development process comprises information identifying a purpose of the application.

12. The computer program product of claim 10, wherein the non-transitory computer-readable medium comprises code causing the first apparatus to initiate, based on receiving the request to initiate the development process, the development process for the application using a project management application.

13. The computer program product of claim 10, wherein the non-transitory computer-readable medium comprises code causing the first apparatus to, when causing the user device to prompt the user to select, for each component of the application, the one or more source capabilities from the plurality of source capabilities, cause the user device to display the plurality of source capabilities for selection by the user.

14. The computer program product of claim 10, wherein each source capability object comprises an extensible markup language file.

15. The computer program product of claim 10, wherein the non-transitory computer-readable medium comprises code causing the first apparatus to maintain, during the development process and for each component of the application, a link between a component of the application and the source capability object generated for the component of the application.

16. A method for generating and maintaining source capability objects for application components, the method comprising:
  receiving, from a user device associated with a user, a request to initiate a development process for an application, wherein the request to initiate the development process identifies one or more components of the application, and wherein the request to initiate the development process comprises information identifying an input, an output, and a function of the application;
  based on receiving the request to initiate the development process, repeatedly and until the user has selected at least one source capability for each component of the application, causing the user device to prompt the user to select, for each component of the application, one or more source capabilities from a plurality of source capabilities, wherein the plurality of source capabilities is based on a source function taxonomy, wherein the source function taxonomy comprises a list of source functions, resource functions, computer functions, network functions, and business functions that one or more applications provide, and wherein causing the user device to prompt the user to select, for each component of the application, the one or more source capabilities from the plurality of source capabilities comprises causing the user device to display a graphical user interface;
  receiving, from the user device via the graphical user interface and for each component of the application, the one or more source capabilities selected by the user;
  receiving, from another user device, a list of source capabilities associated with another planned application;
  querying, based on the list of source capabilities, source capability objects stored in a data repository to obtain a report identifying components associated with each source capability of the list of source capabilities;
  querying, during the development process, the data repository to identify previously developed components corresponding to a subset of the one or more source capabilities selected by the user, wherein the data repository comprises source capability objects previously generated for previously developed components of other previously developed applications;
  generating, for each component of the application not having a corresponding previously developed component in the data repository, a source capability object, wherein the source capability object comprises a metadata object deployable and accessible from a plurality of systems and devices in multiple system environments, and wherein the source capability object comprises information identifying a component for which the source capability object was generated and the one or more source capabilities selected by the user for the component;
  deploying, at an end of the development process, the application;
  storing, based on deploying the application, the source capability object for each component of the application in the data repository;
  predicting, after deploying the application, using a machine learning model, and for each component of the application, whether each source capability of the one or more source capabilities selected by the user for the component of the application is going to fail;
  receiving, after deploying the application, a request to add an additional component to the application;
  causing, after deploying the application and based on receiving the request to add the additional component to the application, the user device to prompt the user to select, for the additional component of the application, one or more additional source capabilities from the plurality of source capabilities;
  receiving, after deploying the application and from the user device, the one or more additional source capabilities selected by the user for the additional component of the application; and
  generating, after deploying the application and for the additional component of the application, another source capability object comprising information identifying the additional component of the application and the one or more additional source capabilities selected by the user for the additional component.

17. The method of claim 16, wherein the request to initiate the development process comprises information identifying a purpose of the application.

18. The method of claim 16 comprising initiating, based on receiving the request to initiate the development process, the development process for the application using a project management application.

19. The method of claim 16, wherein causing the user device to prompt the user to select, for each component of the application, the one or more source capabilities from the plurality of source capabilities comprises causing the user device to display the plurality of source capabilities for selection by the user.

* * * * *